United States Patent
Matsui

(10) Patent No.: US 8,586,237 B2
(45) Date of Patent: Nov. 19, 2013

(54) METHOD FOR MANUFACTURING LITHIUM SECONDARY BATTERY, LITHIUM SECONDARY BATTERY, AND LITHIUM SECONDARY BATTERY SYSTEM

(75) Inventor: Masaki Matsui, Ann Arbor, MI (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 371 days.

(21) Appl. No.: 12/936,297

(22) PCT Filed: Apr. 2, 2009

(86) PCT No.: PCT/IB2009/005153
§ 371 (c)(1),
(2), (4) Date: Dec. 2, 2010

(87) PCT Pub. No.: WO2009/122266
PCT Pub. Date: Oct. 8, 2009

(65) Prior Publication Data
US 2011/0104564 A1    May 5, 2011

(30) Foreign Application Priority Data
Apr. 4, 2008   (JP) ................................. 2008-098030

(51) Int. Cl.
*H01M 4/00*       (2006.01)
*H01M 4/82*       (2006.01)
(52) U.S. Cl.
USPC .......................................... 429/199; 29/623.1
(58) Field of Classification Search
USPC .......................................... 429/199; 29/623.1
See application file for complete search history.

(56) References Cited

U.S. PATENT DOCUMENTS

| 7,656,125 B2 * | 2/2010 | Lampe-Onnerud et al. .. 320/134 |
| 2006/0240327 A1 * | 10/2006 | Xu et al. ....................... 429/324 |
| 2007/0269715 A1 | 11/2007 | Panitz et al. |
| 2009/0325072 A1 * | 12/2009 | Maeda et al. ................. 429/220 |

FOREIGN PATENT DOCUMENTS

| EP | 1 722 427 A1 | 11/2006 |
| JP | A-2005-285447 | 10/2005 |
| JP | A-2006-216378 | 8/2006 |
| JP | A-2007-128723 | 5/2007 |
| WO | WO 2006/115737 A1 | 11/2006 |

OTHER PUBLICATIONS

Written Opinion of the International Searching Authority in International Application No. PCT/IB2009/005153; dated Sep. 1, 2009.

(Continued)

*Primary Examiner* — Mark F Huff
*Assistant Examiner* — Monique Wills
(74) *Attorney, Agent, or Firm* — Oliff & Berridge, PLC

(57) ABSTRACT

To provide a method for manufacturing a lithium secondary battery, characterized by having: a processing lithium secondary battery preparing step for preparing a processing lithium secondary battery that has a positive electrode layer containing $LiFePO_4$ as a positive-electrode active material, a negative electrode layer containing a carbon material as a negative-electrode active material, and nonaqueous electrolyte solution containing $LiPF_6$ and LiBOB; and a film forming step of performing a charging process on the processing lithium secondary battery until a voltage of the processing lithium secondary battery falls within a high voltage range in which a film of an oxidative decomposition product of a BOB anion contained in the LiBOB is formed on a surface of the positive-electrode active material.

13 Claims, 4 Drawing Sheets

(56) References Cited

OTHER PUBLICATIONS

International Preliminary Report on Patentability in International Application No. PCT/IB2009/005153; dated Jul. 15, 2010.
International Search Report in International Application No. PCT/IB2009/005153; dated Sep. 1, 2009.

Yu Bi-tao, et al., "The development of lithium salts for Li-ion battery electrolytes," *Battery Bimonthly*, vol. 34, No. 6, pp. 446-448 (2004).
Translation of Nov. 16, 2012 Office Action issued in Chinese Patent Application No. 200980111295.7.

\* cited by examiner

METHOD FOR MANUFACTURING LITHIUM SECONDARY BATTERY, LITHIUM SECONDARY BATTERY, AND LITHIUM SECONDARY BATTERY SYSTEM

BACKGROUND OF THE INVENTION

1. Field of the Invention

This invention relates to a method for manufacturing a lithium secondary battery that is capable of obtaining a lithium secondary battery having excellent cycle characteristics, the lithium secondary battery manufactured by this method, and a lithium secondary battery system.

2. Description of the Related Art

In the field of information-related devices or communication devices, a lithium secondary battery with high-energy density has been used practically and widely as the power source for such devices, due to the miniaturization of personal computers, video camera, cellular phones and the like. In the field of automobiles as well, use of a lithium secondary battery as the power source of an electrical vehicle has been considered, as the development of electric vehicles has been accelerated due to the environmental and resource problems.

Recently, various experiments have been conducted to improve the characteristics of a lithium secondary battery. For example, Japanese Patent Application Publication No. 2007-128723 (JP-A-2007-128723) discloses a battery in which the open circuit voltage when fully charged falls within a range of 4.25 V to 6.00 V and in which a lithium composite oxide such as $LiCoO_2$ and/or lithium phosphate such as $LiFePO_4$ is used as a positive-electrode active material and an electrolyte solution containing vinylene carbonate, supporting electrolyte ($LiPF_6$) and Lithium Bis (Oxalato) Borate (LiBOB) is used. This technology aims to obtain a battery capable of improving the charge/discharge efficiency even when the upper limit of a charging voltage is set at 4.2 V or higher.

However, this technology is to mainly solve the problems of the lithium composite oxide such as $LiCoO_2$. Specifically, in consideration of the fact that "in the lithium secondary battery that is operated at the maximum of 4.2 V, lithium cobaltate or other positive-electrode active material used in the positive electrode only utilizes approximately 60 percent of the theoretical capacity of the positive electrode" (the paragraph 0005 of JP-A-2007-128723), this technology aims to "improve the charge/discharge efficiency even when a charging voltage is set at 4.2 V or higher" (the paragraph 0008 of JP-A-2007-128723). In other words, the technology described in JP-A-2007428723 aims to enhance the Li discharged amount of the positive-electrode active material per unit weight by setting the upper limit voltage of charging higher than the normal level.

Japanese Patent Application Publication No. 2006-216378 (JP-A-2006-216378) discloses a nonaqueous electrolyte secondary battery in which a specific lithium composite oxide is used as a positive-electrode active material and in which an electrolyte containing $LiPF_6$, LiBOB, and specific aromatic compound is used. This technology aims to prevent the deterioration of the cycle characteristics and battery swelling in high-temperature storage. Japanese Patent Application Publication No. 2005-285447 (JP-A-2005-285447) discloses a lithium ion secondary battery in which $LiFePO_4$ is used as a positive-electrode active material and in which nonaqueous electrolyte solution containing γ-butyrolactone is used. This technology aims to provide a large lithium ion secondary battery having excellent safety and battery performance.

In JP-A-2007-128723 and JP-A-2005-285447, $LiFePO_4$ is used as the positive-electrode active material. Generally, $LiFePO_4$ has excellent thermal safety, large theoretical capacity of 170 mAh/g, and an insertion/elimination reaction of the lithium that progresses at a high voltage of approximately 3.4 V (vs. $Li/Li^+$). Therefore, $LiFePO_4$ is highly expected to be the positive-electrode active material for the next generation. However, the lithium secondary battery that uses $LiFePO_4$ as a positive-electrode active material might not provide sufficient cycle characteristics.

For example, the following problems might possibly occur in a lithium secondary battery that uses $LiFePO_4$ (positive-electrode active material), carbon material (negative-electrode active material) and $LiPF_6$. Specifically, when charging/discharging is performed on the lithium secondary battery having such configuration, the $LiPF_6$ contained in the non-aqueous electrolyte solution is decomposed, and $PF_5$ or HF is generated, whereby the Fe component of $LiFePO_4$ is eluted. Because the eluted Fe component breaks a solid electrolyte interface (SEI) film formed on the carbon material serving as the negative-electrode active material, the capacity is reduced to form the SEI film again. Consequently, deterioration of the cycle characteristics occurs.

On the other hand, because a lithium secondary battery that uses $LiFePO_4$ (positive-electrode active material), carbon material (negative-electrode active material) and $LiPF_6$ is normally charged/discharged at approximately 3.4 V, the upper limit voltage is normally set at approximately 3.6 V to 4.0 V at the time of charging. However, such voltage range does not contribute to the improvement of the cycle characteristics.

SUMMARY OF THE INVENTION

The invention provides a method for manufacturing a lithium secondary battery which is capable of obtaining a lithium secondary battery having excellent cycle characteristics.

A first aspect of the invention relates to a method for manufacturing a lithium secondary battery, which has: preparing a processing battery that has a positive electrode layer containing $LiFePO_4$ as a positive-electrode active material, a negative electrode layer containing a carbon material as a negative-electrode active material, and nonaqueous electrolyte solution containing $LiPF_6$ and LiBOB; charging the processing battery at a high voltage necessary for forming a film of an oxidatively decomposed product of a BOB anion contained in the LiBOB, on a surface of the positive-electrode active material.

According to the configuration described above, a charging process is performed on the processing battery until the voltage thereof falls within a predetermined high voltage range, so that the film of the oxidative decomposition product of the BOB anion is formed on the surface of the positive-electrode active material and a lithium secondary battery with excellent cycle characteristics can be obtained.

In the method for manufacturing a lithium secondary battery according to this aspect, the high voltage may be at least 4.3 V. According to this configuration, the film of the oxidative decomposition product of the BOB anion can be formed more securely.

In the method for manufacturing a lithium secondary battery according to this aspect, the charge of the processing battery may be performed at any of first to fifth charges of the processing lithium secondary battery. According to this configuration, forming the film in an early stage can prevent deterioration of the cycle characteristics.

In the method for manufacturing a lithium secondary battery according to this aspect, the concentration of the LiBOB contained in the nonaqueous electrolyte solution may be at least 0.01 mol/dm$^3$ and not greater than 1.0 mol/dm$^3$. According to this configuration, the film of the oxidative decomposition product of the BOB anion can be formed more securely.

In the method for manufacturing a lithium secondary battery according to this aspect, the processing battery may be charged at the high voltage five times or less.

In the method for manufacturing a lithium secondary battery according to this aspect, the LiFePO$_4$ contained in the positive electrode layer may be in the form of particle, and an average particle diameter of the LiFePO$_4$ may be 1 μm to 50 μm.

In the method for manufacturing a lithium secondary battery according to this aspect, the proportion of the LiFePO$_4$ to the total positive-electrode active material contained in the positive electrode layer may be at least 30 wt %.

In the method for manufacturing a lithium secondary battery according to this aspect, the thickness of the positive electrode layer may be 10 μm to 250 μm.

In the method for manufacturing a lithium secondary battery according to this aspect, the positive electrode layer may further contain at least one substance selected from a group consisting of LiCoO$_2$, LiMn$_2$O$_4$, LiNiO$_2$, LiNi$_{0.5}$Mn$_{1.5}$O$_4$, LiNi$_{1/3}$Mn$_{1/3}$Co$_{1/3}$O$_2$, LiNi$_{0.5}$Mn$_{0.5}$O$_2$, LiCoPO$_4$, and LiMnPO$_4$, as the positive-electrode active material other than the LiFePO$_4$.

In the method for manufacturing a lithium secondary battery according to this aspect, the positive electrode layer may further contain LiCoO$_2$ as the positive-electrode active material other than the LiFePO$_4$.

A lithium secondary battery may be manufactured by the above-described method according to this aspect.

A lithium secondary battery system may have the lithium secondary battery manufactured by the method for manufacturing a lithium secondary battery according to this aspect, and a controller for controlling an upper limit of a voltage for charging the lithium secondary battery to 4.1 V or lower.

A second aspect of the invention relates to a lithium secondary battery system having: a lithium secondary battery which has a positive electrode layer containing LiFePO$_4$ as a positive-electrode active material, a negative electrode layer containing a carbon material as a negative-electrode active material, and nonaqueous electrolyte solution containing LiPF$_6$ and LiBOB, and in which a film of an oxidatively decomposed product of a BOB anion contained in the LiBOB is formed on a surface of the positive-electrode active material; and a controller for controlling an upper limit voltage of charging the lithium secondary battery to 4.1 V or lower.

According to the configuration described above, by providing the controller for controlling the upper limit voltage of the lithium secondary battery, not only is it possible to prevent excessive decomposition of the nonaqueous electrolyte solution, but also it is possible to prevent deterioration of the cycle characteristics that is caused by oxidative decomposition of the nonaqueous electrolyte solution. Furthermore, because the film of the oxidative decomposition product of the BOB anion is formed on the surface of the positive-electrode active material of the lithium secondary battery according to this aspect, the cycle characteristics can be improved. Due to these effects, a lithium secondary battery system that has a lithium secondary battery with excellent cycle characteristics can be obtained.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

As a result of a keen investigation by the inventors, the inventors have discovered, in a system using a LiFePO$_4$ (positive-electrode active material), carbon material (negative-electrode active material) and LiPF$_6$, that a lithium secondary battery with excellent cycle characteristics can be obtained by adding LiBOB to nonaqueous electrolyte solution and charging it within a predetermined range of high voltage (for example, a voltage of at least 4.3 V).

A method for manufacturing a lithium secondary battery and a lithium secondary battery system according to an embodiment of the invention are described hereinafter in detail.

Figure 1:
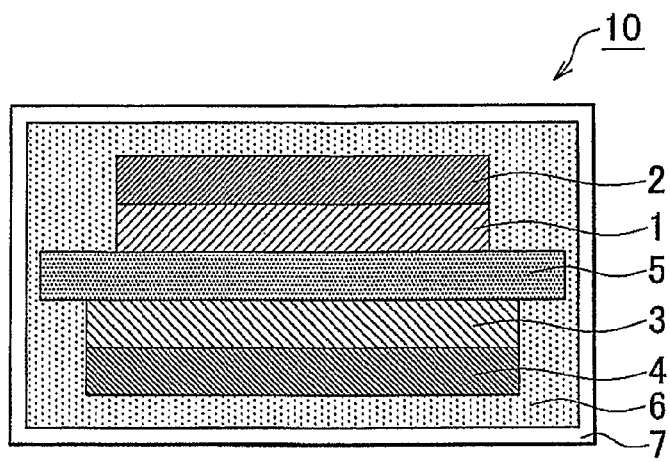
FIG. 1 is a schematic cross-sectional diagram showing a processing lithium secondary battery according to an embodiment of the invention.

The method for manufacturing a lithium secondary battery according to an embodiment of the invention is described with reference to the drawings. First, a processing lithium secondary battery is prepared (processing lithium secondary battery preparing step). FIG. 1 is a schematic cross-sectional diagram showing a processing lithium secondary battery according to the embodiment. The processing lithium secondary battery 10 shown in FIG. 1 has a positive electrode layer 1 containing the LiFePO$_4$, a positive electrode current collector 2 for collecting current of the positive electrode layer 1, a negative electrode layer 3 containing a carbon material, a negative electrode current collector 4 for collecting current of the negative electrode layer 3, a separator 5 disposed between the positive electrode layer 1 and the negative electrode layer 3, a nonaqueous electrolyte solution 6 that conducts lithium ions between the positive electrode layer 1 and the negative electrode layer 3 and contains LiPF$_6$ and LiBOB, and a battery case 7 storing these members therein. The processing lithium secondary battery 10 is an example of the processing battery of this invention.

Figure 2A:
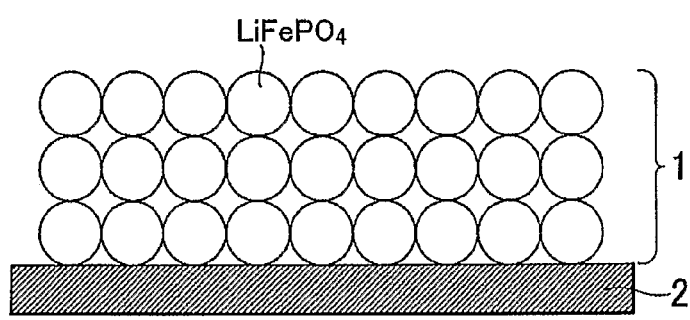
FIG. 2A is a schematic cross-sectional diagram for explaining the condition of a surface of a positive-electrode active material obtained in a film forming step.
Figure 2B:
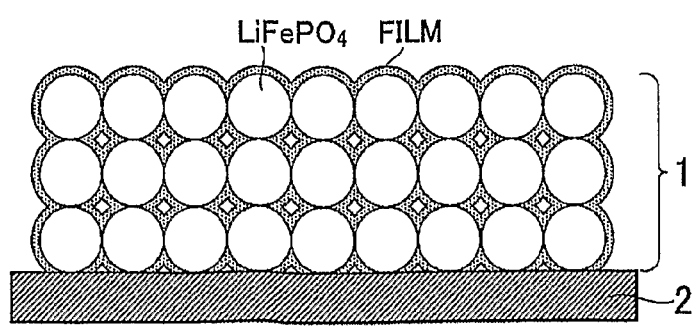
FIG. 2B is a schematic cross-sectional diagram for explaining the condition of the surface of the positive-electrode active material obtained in the film forming step.

Next, a charging process is performed until the voltage of the obtained processing lithium secondary battery falls in a predetermined range of high voltage (film forming step). FIG. 2 is a schematic cross-sectional diagram for explaining the condition of a surface of a positive-electrode active material obtained in the film forming step. As shown in FIG. 2A, the positive electrode layer 1 of the processing lithium secondary battery, which is formed on the positive electrode current collector 2, contains particulate $LiFePO_4$. It should be noted that the descriptions of a conductive material and binder included in the positive electrode layer 1 are omitted. Subsequently, a charge-discharge process is performed until the voltage of the processing lithium secondary battery reaches, for example, at least 4.3 V. As a result, a film of an oxidative decomposition product of BOB anion contained in LiBOB is formed on the surface of the $LiFePO_4$, as shown in FIG. 2B. This film contributes significantly to improving the cycle characteristics of the processing lithium secondary battery. Hereinafter, each step of the method for manufacturing the lithium secondary battery according to the embodiment of the invention is described.

The processing lithium secondary battery preparing step of the embodiment is a step of preparing the processing lithium secondary battery that has the positive electrode layer containing the $LiFePO_4$ as a positive-electrode active material, the negative electrode layer containing a carbon material as a negative-electrode active material, and the nonaqueous electrolyte solution containing $LiPF_6$ and LiBOB. Here, the processing lithium secondary battery obtained by this step has at least the positive electrode layer, negative electrode layer and nonaqueous electrolyte. In addition, this processing lithium secondary battery normally has the positive electrode current collector, negative electrode current collector, separator, battery case, extraction electrode, and the like. The configurations of the processing lithium secondary battery are described next.

The positive electrode layer used in this invention contains the $LiFePO_4$ as a positive-electrode active material. The positive electrode layer may also contain a positive-electrode active material other than the $LiFePO_4$. It is preferred that the positive electrode layer contain a conductive material and a binder.

It is preferred that the average particle diameter of the $LiFePO_4$ be, for example, within a range of 1 μm to 50 μm, within a range of 1 μm to 20 μm, or particularly within a range of 3 μm to 5 μm. An excessively small average particle diameter of the $LiFePO_4$ might degrade the handleability, but an excessively large average particle diameter might make it difficult to obtain a flat positive electrode layer. Note that the average particle diameter of the $LiFePO_4$ can be measured by, for example, observing the $LiFePO_4$ using a scanning electron microscope (SEM) or by using a laser diffraction/scattering method.

The positive electrode layer used in the invention may contain only the $LiFePO_4$ as the positive-electrode active material, or may contain the $LiFePO_4$ and a positive-electrode active material other than the $LiFePO_4$. The positive-electrode active material other than the $LiFePO_4$ is not particularly limited as long as it can store/release lithium ions. Examples of such a positive-electrode active material include $LiCoO_2$, $LiMn_2O_4$, $LiNiO_2$, $LiNi_{0.5}Mn_{1.5}O_4$, $LiNi_{1/3}Mn_{1/3}Co_{1/3}O_2$, $LiNi_{0.5}Mn_{0.5}O_2$, $LiCoPO_4$, and $LiMnPO_4$, and, above all, $LiCoO_2$ is preferred, as it can realize high-energy density.

When the positive electrode layer contains the $LiFePO_4$ and a positive-electrode active material other than the $LiFePO_4$, it is preferred that the proportion of the $LiFePO_4$ to the total positive-electrode active material be large, so that the effect of the invention can be achieved more favorably. The proportion of the $LiFePO_4$ to the total positive-electrode active material is preferably, for example, at least 30 wt %, more preferably at least 50 wt %, or even more preferably at least 70 wt %.

The content of the positive-electrode active material in the positive electrode layer is not particularly limited but is preferably, for example, within a range of 60 wt % to 97 wt %, more preferably 75 wt % to 97 wt %, or even more preferably 90 wt % to 97 wt %.

In this embodiment, the positive electrode layer may contain a conductive material to improve the conductivity of the processing lithium secondary battery. Examples of the conductive material include carbon black, such as acetylene black and ketjen black. In addition, the content of the conductive material in the positive electrode layer is normally within a range of 1 wt % to 10 wt %, although the content varies depending on the conductive material type.

In this embodiment, the positive electrode layer may contain a binder so that the positive-electrode active material can be solidified rigidly. Examples of the binder can include polyvinylidene-fluoride (PVDF), polytetrafluoroethylene (PTFE) and the like. The content of the binder in the positive electrode layer may be in the amount sufficient to solidify the positive-electrode active material and the like is preferably lower than this amount. The content of the binder is normally within a range of 1 wt % to 10 wt %.

The thickness of the positive electrode layer used in this embodiment varies depending on the application of the lithium secondary battery to be produced, but it is preferred that the thickness of the positive electrode layer fall, for example, within a range of 10 μm to 250 μm, within a range of 20 μm to 200 μm, or particularly within a range of 30 μm to 150 μm.

A method for forming the positive electrode layer is not particularly limited as long as the abovementioned positive electrode layer can be obtained. Examples of the method for forming the positive electrode layer include a method for mixing the positive-electrode active material, conductive material and binder together first and dispersing the mixture into a solvent such as N-methyl-pyrrolidone to prepare a positive electrode layer forming slurry, and then applying the positive electrode layer forming slurry to a positive electrode current collector and drying thus obtained product. Moreover, the electrode density may be improved by means of pressing, if necessary.

Next, the negative electrode layer used in this embodiment is described next. The negative electrode layer used in this embodiment contains a carbon material as the negative-electrode active material. The negative electrode layer preferably contains only a carbon material as the negative-electrode active material. In addition, the negative electrode layer may contain a binder or, if necessary, a conductive material.

The carbon material used in this embodiment is not particularly limited as long as it can store/release lithium ions. Examples of the carbon material include artificial graphite such as mesocarbon microbead (MCMB), natural graphite, hard carbon, soft carbon and the like. Two or more types of carbon materials may be used when implementing the invention. Note that the hard carbon is generally a carbon material that is not converted to graphite through heat treatment at approximately 3000° C., while soft carbon is generally a carbon material that is converted to graphite through heat treatment at approximately 3000° C.

The content of the carbon material in the negative electrode layer is not particularly limited but preferably falls, for example, within a range of 60 wt % to 97 wt %, within a range of 75 wt % to 97 wt %, or particularly within a range of 90 wt % to 97 wt %. Note that the descriptions of the binder and the conductive material that are used in the negative electrode layer are omitted here, as the binder and the conductive material used in the negative electrode layer are similar to those used in the abovementioned positive electrode layer.

The thickness of the negative electrode layer used in this embodiment varies depending on the application of the lithium secondary battery to be produced, but it is preferred that the thickness of the negative electrode layer fall, for example, within a range of 10 μm to 100 μm or within a range of 10 μm to 50 μm.

A method for forming the positive electrode layer is not particularly limited as long as the abovementioned negative electrode layer can be obtained. Examples of the method for forming the negative electrode layer include a method for mixing the negative-electrode active material and binder together first and dispersing the mixture into a solvent such as N-methyl-pyrrolidone to prepare a negative electrode layer forming slurry, and then applying the negative electrode layer forming slurry to a negative electrode current collector and drying thus obtained product. Moreover, the electrode density may be improved by means of pressing, if necessary.

The nonaqueous electrolyte solution used in the invention is described next. The nonaqueous electrolyte solution used in the invention contains $LiPF_6$ and LiBOB. The nonaqueous electrolyte solution contains a nonaqueous solvent in addition to $LiPF_6$ and LiBOB.

The $LiPF_6$ is added as a supporting electrolyte of the nonaqueous electrolyte solution. The concentration of the $LiPF_6$ contained in the nonaqueous electrolyte solution is the same as the concentration of a general lithium secondary battery in a nonaqueous electrolyte solution and thus is not particularly limited. However, the concentration of $LiPF_6$ falls within a range of for example, 0.1 mol/dm$^3$ to 2.0 mol/dm$^3$.

The LiBOB, on the other hand, is a compound expressed by the following structural formula (1) and has Li cation and BOB anion.

[Formula 1]

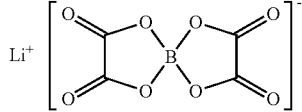

Structural formula (1)

The concentration of the LiBOB contained in the nonaqueous electrolyte solution is not particularly limited as long as a film of an oxidative decomposition product obtained by oxidatively decomposing the BOB anion can be formed on the surface of the positive-electrode active material. The concentration of the LiBOB is preferably, for example, at least 0.01 mol/dm$^3$, at least 0.05 mol/dm$^3$, or more preferably at least 0.1 mol/dm$^3$. If the concentration of the LiBOB is excessively low, it is difficult to form the film for preventing elution of a Fe component. In addition, the concentration of the LiBOB is preferably, for example, 1.0 mol/dm$^3$ or lower, 0.5 mol/dm$^3$ or lower, or more preferably 0.3 mol/dm$^3$ or lower. Excessively high concentration of the LiBOB reduces the ion conductivity in the nonaqueous electrolyte solution, consequently increasing the battery resistance.

The nonaqueous electrolyte solution used in the invention may have an additive according to need. Examples of the additive include vinylene carbonate (VC) and the like. Addition of VC can prevent the generation of irreversible capacity in the initial charge. The content of VC in the nonaqueous electrolyte solution is within a range of, for example, 0.5 wt % to 5 wt %.

For example, propylene carbonate, ethylene carbonate (EC), diethyl carbonate, dimethyl carbonate, ethyl methyl carbonate, 1,2-dimethoxyethane, 1,2-diethoxyethane, acetonitrile, propionitrile, tetrahydrofuran, 2-methyl tetrahydrofuran, dioxane, 1,3-dioxolan, nitromethane, N,N-dimethylformamide, dimethylsulfoxide, sulfolane, γ-butyrolactone, and the like may be used as the nonaqueous solvent used in the invention. Not only one of these nonaqueous solvent but also a mixture of two or more of these nonaqueous solvent may be used.

The processing lithium secondary battery according to the embodiment of the invention normally has a positive electrode current collector, negative electrode connector, separator, battery case, and extraction electrode, in addition to the positive electrode layer and negative electrode layer described above. The same members as the members used in a general lithium secondary battery can be used as the abovementioned members.

The positive electrode current collector functions to collect current of the positive electrode layer. Examples of the material of the positive electrode current collector include aluminum, stainless steel, nickel, iron, titan, and the like. The positive electrode current collector can be formed into, for example, a foil, plate or mesh. The negative electrode current collector, on the other hand, functions to collect current of the negative electrode layer. Examples of the material of the negative electrode current collector include copper, stainless steel, nickel, and the like. The negative electrode current collector can be formed into, for example, a foil, plate or mesh.

The separator is normally disposed between the positive electrode layer and the negative electrode layer. Examples of the material of the separator include polyethylene (PE), polypropylene (PP), polyester, cellulose, polyamide, and other resins, but PE and PP are preferred.

Figure 3:
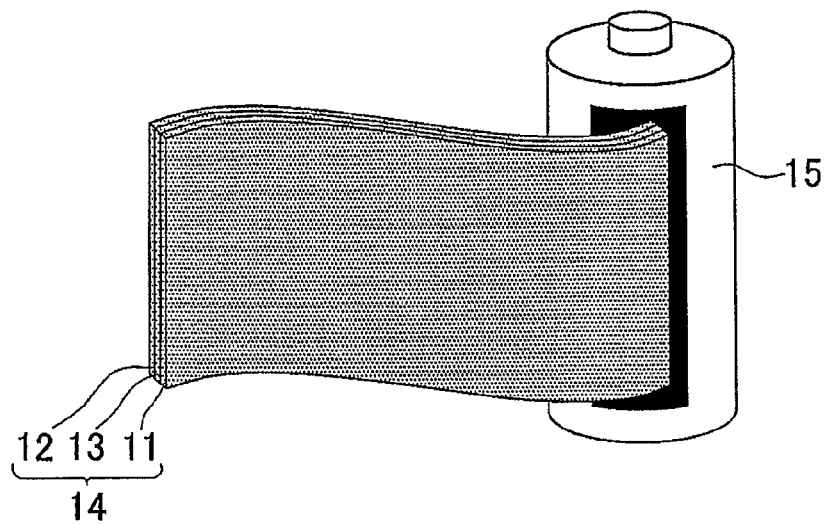
FIG. 3 is a schematic cross-sectional diagram for explaining a lithium secondary battery obtained by the embodiment of the invention.

The battery case according to the embodiment stores the positive electrode layer, negative electrode layer, nonaqueous electrolyte solution, positive electrode current collector, negative electrode current collector, and separator that are mentioned above, The battery case can be formed into, for example, a cylinder, angle shape, coin, laminated shape, or the like. The processing lithium secondary battery normally has an electrode body that has at least the positive electrode layer, separator and negative electrode layer. The electrode body can be formed into, for example, a plain plate, roll shape, or the like. FIG. 3 is a schematic cross-sectional diagram for explaining an example of the lithium secondary battery obtained by the invention. This lithium secondary battery has an electrode body 14 that has a positive electrode body 11 having a positive electrode layer and positive electrode current collector, a negative electrode body 12 having a negative electrode layer and negative electrode current collector, and a separator 13 disposed between the positive electrode body 11 and the negative electrode body 12. The electrode body 14 is in the shape of a roll and stored in a cylindrical battery case 15.

The method for assembling the processing lithium secondary battery of the embodiment is similar to the method for assembling a general lithium secondary battery and thus is not particularly limited. The assembly method may be selected appropriately in accordance with the shapes of the electrode body or battery case. For example, in the case of assembling a coin-shaped processing lithium secondary battery, examples of such assembly method include a method for disposing a negative electrode body having a negative electrode layer and negative electrode current collector in a negative electrode type battery case first, then disposing a separator on the surface of the negative electrode layer, dropping nonaqueous electrolyte solution thereon, disposing a positive electrode body having a positive electrode layer and positive electrode current collector, thereafter disposing a positive electrode side battery case, and finally cramping the negative electrode type battery case and the positive electrode side battery case.

A film forming step performed in the embodiment is described next. The film forming step according to the embodiment is to perform a charging process on the processing lithium secondary battery until the voltage of the processing lithium secondary battery falls within a range of high voltage in which the film of the oxidative decomposition product of the BOB anion contained in the LiBOB is formed on the surface of the positive-electrode active material.

The range of high voltage in the embodiment is not particularly limited as long as the film of the oxidative decomposition product of the BOB anion contained in the LiBOB is formed on the surface of the positive-electrode active material in this range. Note that the presence of the film can be confirmed using, for example, an X-ray XPS.

In this embodiment, it is desired that the high voltage be at least 4.3 V, more preferably at least 4.4 V, still more preferably at least 4.5 V, or even more preferably at least 4.6 V. If the voltage is excessively low, it is difficult to form the film. In addition, normally the high voltage is preferably 5.5 V or lower, or more preferably 4.8 or lower. With regard the $LiFePO_4$ used in the embodiment, because Li contained in the $LiFePO_4$ is normally released at a voltage of approximately 3.4 V, an increase in the amount of released Li cannot be confirmed even when the upper limit voltage is set at 4.2 V at the time of charging. However, excessively high voltage causes excessive oxidative decomposition of the nonaqueous electrolyte solution: Note that the range of high voltage described in the embodiment is set on the basis of lithium metal.

Moreover, in the embodiment the timing for carrying out the film forming step can be set arbitrarily. In other words, the film forming step may be performed at the time of initial charge of the processing lithium secondary battery or after the processing lithium secondary battery is charged/discharged a number of times (two to several hundreds of times, for example). Above all, in this embodiment it is preferred that the film forming step be performed when the processing lithium secondary battery is charged/discharged less number of times. Forming the film in an early stage can prevent deterioration of the cycle characteristics. In this invention it is preferred that the film forming step be performed upon any of the first to fifth charging of the processing lithium secondary battery. It is also preferred that the film forming step be performed upon any of the first to third charging of the processing lithium secondary battery. It is more preferred that the film forming step be performed upon the first charging of the processing lithium secondary battery.

Although the number of times the film forming step is performed is not Particularly limited in this embodiment, it is preferred that the film forming step be performed less number of times in order to prevent excessive decomposition of the nonaqueous electrolyte solution. Preferably, the film forming step is performed, for example, five times or less, three times or less, or more preferably once.

The lithium secondary battery system according to the embodiment is described next. The lithium secondary battery system according to the embodiment is characterized in having a lithium secondary battery which has a positive electrode layer containing $LiFePO_4$ as the positive-electrode active material, a negative electrode layer containing a carbon material as the negative-electrode active material, and nonaqueous electrolyte solution containing $LiPF_6$ and LiBOB, and in which a film of an oxidative decomposition product of the BOB anion contained in the LiBOB is formed on the surface of the positive-electrode active material, and a controller for controlling the upper limit voltage of the lithium secondary battery to 4.1 V or lower.

According to this embodiment, by providing the controller for controlling the upper limit voltage of the lithium secondary battery, not only is it possible to prevent excessive decomposition of the nonaqueous electrolyte solution, but also it is possible to prevent deterioration of the cycle characteristics that is caused by oxidative decomposition of the nonaqueous electrolyte solution. Furthermore, because the film of the oxidative decomposition product of the BOB anion is formed on the surface of the positive-electrode active material of the lithium secondary battery used in the embodiment, the cycle characteristics can be improved. Due to these effects, the lithium secondary battery having excellent cycle characteristics can be obtained. Note that the upper limit voltage of the lithium secondary battery is controlled to 4.1 V or lower. Because oxidative decomposition of the nonaqueous electrolyte solution normally occurs significantly at a voltage of at least 4.2 V in the lithium secondary battery, the deterioration of the cycle characteristics that is caused by the oxidative decomposition of the nonaqueous electrolyte solution is prevented by controlling the upper limit voltage to 4.1 V or lower.

Figure 4:
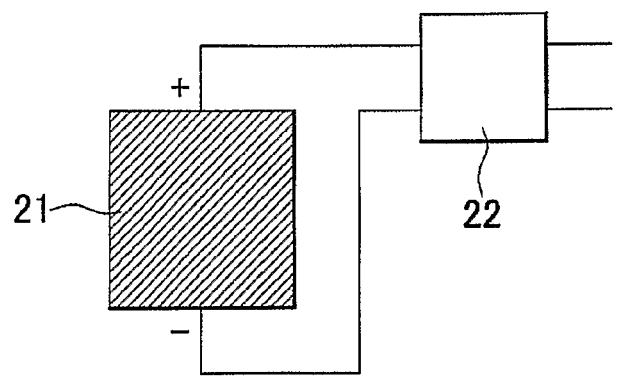
FIG. 4 is a schematic cross-sectional diagram showing a lithium secondary battery system according to the embodiment of the invention.

FIG. 4 is a schematic cross-sectional diagram showing the lithium secondary battery system according to the embodiment of the invention. The lithium secondary battery shown in FIG. 4 has a lithium secondary battery 21, and a controller 22 for controlling the upper limit voltage of the lithium secondary battery to 4.1 V or lower. The configurations of the lithium secondary battery system of the invention are described hereinafter.

The lithium secondary battery 21 according to the embodiment of this invention has a positive electrode layer containing $LiFePO_4$ as the positive-electrode active material, a negative electrode layer containing a carbon material as the negative-electrode active material, and nonaqueous electrolyte solution containing $LiPF_6$ and LiBOB, wherein a film of an oxidative decomposition product of the BOB anion contained in the LiBOB is formed on the surface of the positive-electrode active material. The descriptions of each component of this lithium secondary battery and of the method for manufacturing this lithium secondary battery are omitted, as they are the same as those described in the method for manufacturing the lithium secondary battery 10.

Figure 5:
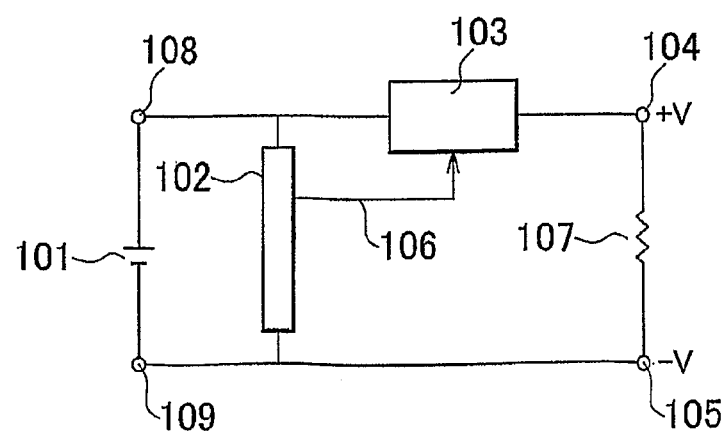
FIG. 5 is an explanatory diagram showing a controller according to the embodiment of the invention.

The controller used in the embodiment is not particularly limited as long as it can control the upper limit voltage of the lithium secondary battery to 4.1 V or lower. FIG. 5 is an explanatory diagram showing the controller according to the embodiment of the invention. A lithium secondary battery 101 (with a positive electrode terminal 108 and a negative electrode terminal 109) is connected to an external terminal (−V) 105 and an external terminal (+V) 104 via a switch circuit 103 (charge termination part). A load 107 is connected to the external terminal (−V) 105 and external terminal (+V) 104. Moreover, a charge/discharge control circuit 102 is connected in parallel with the lithium secondary battery 101. This charge/discharge control circuit 102 (monitor part) functions to monitor the voltage of the lithium secondary battery 101. When the voltage of the lithium secondary battery 101 reaches a charging voltage of 4.1 V, the charge/discharge control circuit 102 outputs a signal, which is transmitted to the switch circuit 103 via a signal line 106, whereby the switch circuit 103 is turned OFF. As a result, the lithium secondary battery 101 enters a charge completion state. Here, the switch circuit 103 (charge termination part), external terminal (+V) 104, external terminal (−V) 105, signal line 106, and load 107 constitute the controller.

The embodiment is described in further detail next.

Example 1

First, a 1 Ah class cylindrical processing lithium secondary battery was prepared. 80 wt % of $LiFePO_4$ as the positive-electrode active material, 15 wt % of carbon black as the conductive material, and 5 wt % of PVDF as the binder were mixed together and dispersed in a N-methyl-pyrrolidone to prepare a positive electrode layer forming slurry. The obtained positive electrode layer forming slurry was applied to the surface of a strip-like current collector consisting of Al and having a thickness of 15 μm such that the thickness of the slurry becomes 30 μm. As a result, a positive electrode body was obtained. Next, 95 wt % of MCMB (manufactured by Osaka Gas Co., Ltd) as the negative-electrode active material and 5 wt % of PVDF as the binder were mixed together and dispersed in the N-methyl-pyrrolidone to obtain a negative electrode layer forming slurry. Thereafter, the obtained negative electrode layer forming slurry was applied to the surface of a strip-like current collector consisting of Cu and having a thickness of 20 μm such that the thickness of the slurry becomes 30 μm. As a result, a negative electrode body was obtained.

Next, a separator consisting of a microporous membrane of PP was prepared. Thereafter, a positive electrode layer of the positive electrode body was disposed on one of the surfaces of the separator, and a negative electrode layer of the negative electrode body on the other surface of the separator. As a result, an electrode body in which the positive electrode body, the separator, and the negative electrode body are disposed in this order was obtained. This electrode body was rolled into a spiral to obtain a rolled type electrode body. Next, the rolled type electrode body was stored in a cylindrical battery case (type 18650), and nonaqueous electrolyte solution was injected thereto. The nonaqueous electrolyte solution is obtained by dissolving 1M of $LiPF_6$ and 0.05M of LiBOB in a nonaqueous solvent in which EC and dimethyl carbonate are mixed at a volume ratio of 1:1. In this manner, the cylindrical processing lithium secondary battery was obtained.

Next, the film forming step was performed on this obtained processing lithium secondary battery. First, running-in was performed on this processing lithium secondary battery (three cycles) under the conditions of 25° C. and 0.1 C. Thereafter, while performing charge/discharge on the processing lithium secondary battery under the conditions of charging/discharging at 1 Acc, upper limit voltage of 4.0 V, lower limit voltage of 2.5 V, and temperature of 60° C., the upper limit voltage was set at 4.4 V only when the first charging was performed. In this manner, the cylindrical lithium secondary battery in which the film of the oxidative decomposition product of the BOB anion was formed on the surface of the positive-electrode active material was obtained. Note that the discharged capacity was 981 mAh at the third cycle.

Examples 2 to 10, Comparative Examples 1 to 3

A cylindrical lithium secondary battery was obtained in the same manner as in Example 1, except that the type of the positive-electrode active material, the type of the negative-electrode active material, the type of the solute of the nonaqueous electrolyte solution, and the various conditions for the film forming step were changed as described in Table 1. Note in Table 1 that NG-7 represents natural graphite NG-7 (manufactured by Kansai Coke and Chemicals Co., Ltd.), and VC represents vinylene carbonate.

TABLE 1

| | Positive-electrode active material | Negative-electrdoe active material | Solute of nonaqueous electrolyte solution | Timing for film forming step | Upper limit voltage when perfoming film forming step | Discharged capacity of third cycle mAh |
|---|---|---|---|---|---|---|
| Example 1 | $LiFePO_4$ | MCMB | 1M $LiPH_6$ 0.05M LiBOB | First charge | 4.4 V | 981 |
| Example 2 | $LiFePO_4$ | MCMB | 1M LiPHg 0.05M LiBOB | Third charge | 4.4 V | 985 |
| Example 3 | $LiFePO_4$ | MCMB | 1M $LiPH_6$ 0.05M LiBOB | First charge | 4.6 V | 984 |
| Example 4 | $LiFePO_4$ | MCMB | 1M $LiPH_6$ 0.05M LiBOB | Third charge | 4.6 V | 992 |
| Example 5 | $LiFePO_4$ | MCMB | 1M $LiPH_6$ 0.01M LiBOB | First charge | 4.4 V | 976 |
| Example 6 | $LiFePO_4$ | MCMB | 1M $LiPH_6$ 0.05M LiBOB 1 wt % VC | First charge | 4.4 V | 982 |
| Example 7 | 50 wt % $LiFePO_4$ 50 wt % $LiCoO_2$ | MCMB | 1M $LiPH_6$ 0.05M LiBOB | First charge | 4.4 V | 986 |
| Example 8 | 50 wt % $LiFePO_4$ 50 wt % $LiCoO_2$ | MCMB | 1M $LiPH_6$ 0.05M LiBOB 1 wt % VC | First charge | 4.4 V | 982 |
| Example 9 | $LiFePO_4$ | NG7 | 1M $LiPH_6$ 0.05M LiBOB | First charge | 4.4 V | 979 |
| Example 10 | $LiFePO_4$ | NG7 | 1M $LiPH_6$ 0.05M LiBOB 1 wt % VC | First charge | 4.4 V | 977 |
| Comparative Example 1 | $LiFePO_4$ | MCMB | 1M $LiPH_6$ | — | — | 982 |

TABLE 1-continued

| | Positive-electrode active material | Negative-electrode active material | Solute of nonaqueous electrolyte solution | Timing for film forming step | Upper limit voltage when performing film forming step | Discharged capacity of third cycle mAh |
|---|---|---|---|---|---|---|
| Comparative Example 2 | $LiFePO_4$ | MCMB | 1M LiBOB | — | — | 973 |
| Comparative Example 3 | $LiFePO_4$ | MCMB | 1M $LiPH_6$ 0.05M LiBOB | — | — | 983 |

The cycle characteristics of the cylindrical lithium secondary batteries obtained in Examples 1 to 10 and Comparative Examples 1 to 3 were evaluated. As described above, the cylindrical lithium secondary battery that was finished with the three cycles of charging/discharging in the film forming step was continuously charged/discharged up to 100 cycles under the same charging/discharging conditions. Table 2 shows the discharged capacities obtained at the third cycle, the $10^{th}$ cycle, the $50^{th}$ cycle, and the $100^{th}$ cycle. Note that the capacity retention factor (%) shown in Table 2 represents the percentage of the discharged capacity obtained at the $100^{th}$ cycle to the discharged capacity obtained at the third cycle.

TABLE 2

| | Discharged capacity mAh | | | | Capacity retention rate(%) |
|---|---|---|---|---|---|
| | 3rd cycle | 10th cycle | 50th cycle | 100th cycle | 100 cyc/3 cyc |
| Example 1 | 981 | 979 | 975 | 969.1 | 98.8 |
| Example 2 | 985 | 982 | 976.5 | 968 | 98.3 |
| Example 3 | 984 | 983 | 980 | 972.1 | 98.8 |
| Example 4 | 992 | 988.9 | 984.8 | 976.1 | 98.4 |
| Example 5 | 976 | 972 | 961 | 949.6 | 97.3 |
| Example 6 | 982 | 980.4 | 976.9 | 970 | 98.8 |
| Example 7 | 986 | 982 | 970 | 962.7 | 97.6 |
| Example 8 | 982 | 982.3 | 978.9 | 971.1 | 98.9 |
| Example 9 | 979 | 975 | 970.4 | 965.9 | 98.7 |
| Example 10 | 977 | 975.8 | 971.8 | 967 | 99.0 |
| Comparative Example 1 | 982 | 960 | 897.1 | 646.5 | 65.8 |
| Comparative Example 2 | 973 | 964.1 | 927.3 | 856.3 | 88.0 |
| Comparative Example 3 | 983 | 964.9 | 909.4 | 709.4 | 72.2 |

Figure 6:
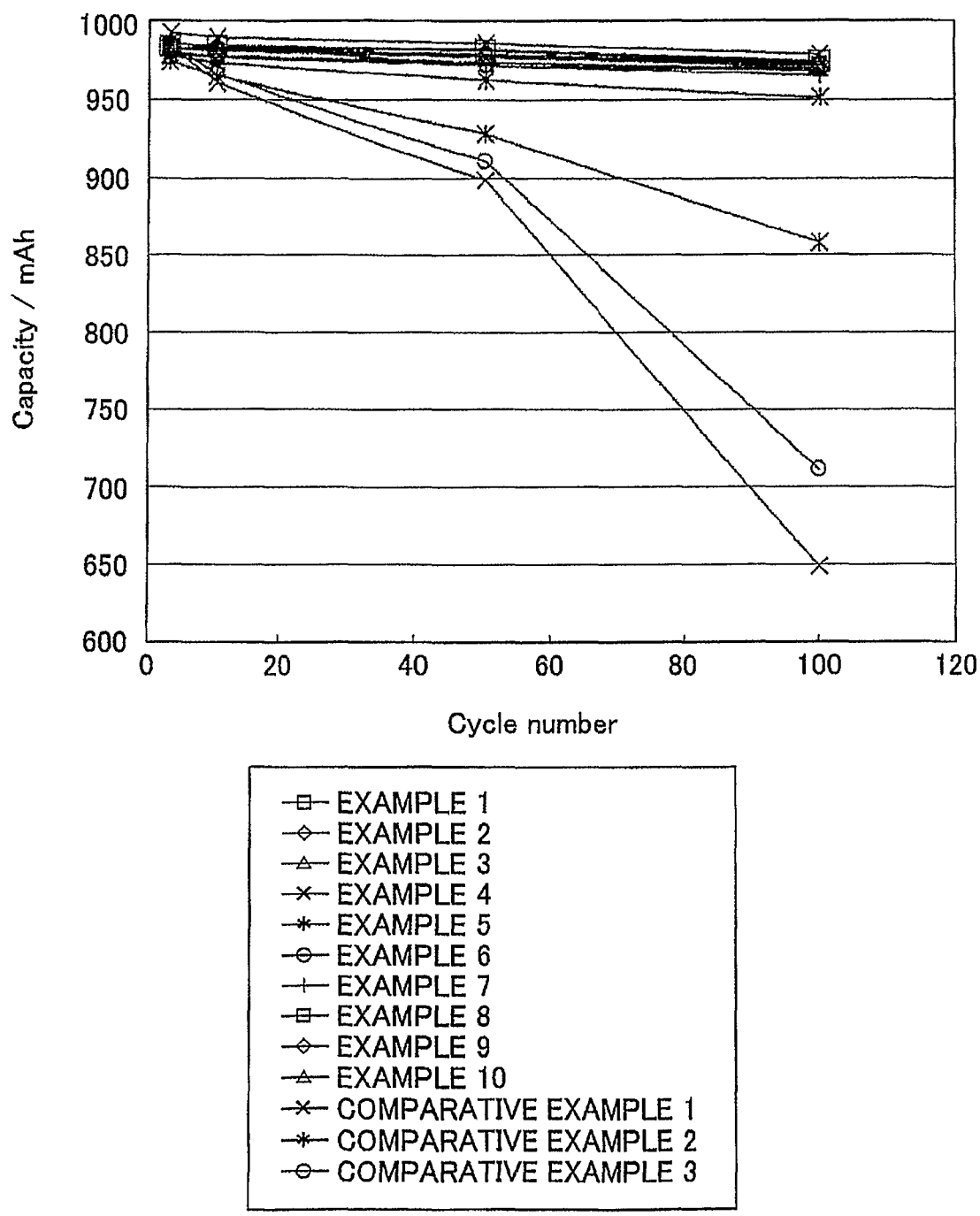
FIG. 6 is a graph showing the results of discharged capacities shown in Table 2.

As shown in Table 2, the cylindrical lithium secondary batteries obtained in Examples 1 to 10 represented excellent capacity retention rate at 100th cycle, compared to the cylindrical lithium secondary batteries obtained in Comparative Examples 1 to 3. Although $LiPF_6$ and LiBOB were added to the nonaqueous electrolyte solution in the cylindrical lithium secondary battery obtained in Comparative Example 3, the film of the oxidative decomposition product of the BOB anion is not generated because the upper limit voltage is 4.0 V when charging this battery. Therefore, the capacity retention rate of this lithium secondary battery is low. FIG. 6 is a graph showing the results of the discharged capacities shown in Table 2. As shown in FIG. 6, although the discharged capacities of the cylindrical lithium secondary batteries obtained in Examples 1 to 10 were not reduced, it was confirmed that the discharged capacities of the cylindrical lithium secondary batteries obtained in Comparative Examples 1 to 3 were reduced with an increase in the number of cycles.

The cylindrical lithium secondary battery that was finished with the $100^{th}$ cycle charging/discharging was broken down in a glove box, and the extracted positive electrode body was cleaned with the dimethyl carbonate and subjected to surface analysis using the XPS. The analytical elements of C, O, F, Li, P, Fe, B and Co were taken to analyze the depth direction of the positive electrode layer by means of an argon ion gun (0 sec etching, 10 sec etching, 60 sec etching). The composition ratio of F (atm %) is shown in Table 3.

TABLE 3

| | Composition ratio of F (atm %) | | |
|---|---|---|---|
| | 0 sec etching | 10 sec etching | 60 sec etching |
| Example 1 | 15.2 | 7.2 | 0.9 |
| Example 2 | 16.8 | 9.3 | 2.2 |
| Example 3 | 17.3 | 8.8 | 1.3 |
| Example 4 | 14.6 | 6.9 | 2.2 |
| Example 5 | 19.2 | 11.2 | 3.2 |
| Example 6 | 16.3 | 8.8 | 1.8 |
| Example 7 | 15.5 | 7.8 | 1.75 |
| Example 8 | 14.2 | 7.6 | 1 |
| Example 9 | 16.7 | 8 | 1.6 |
| Example 10 | 18.6 | 8.5 | 1.8 |
| Comparative Example 1 | 36 | 25.6 | 20.2 |
| Comparative Example 2 | 0 | 0 | 0 |
| Comparative Example 3 | 33 | 21.2 | 16.9 |

Figure 7:
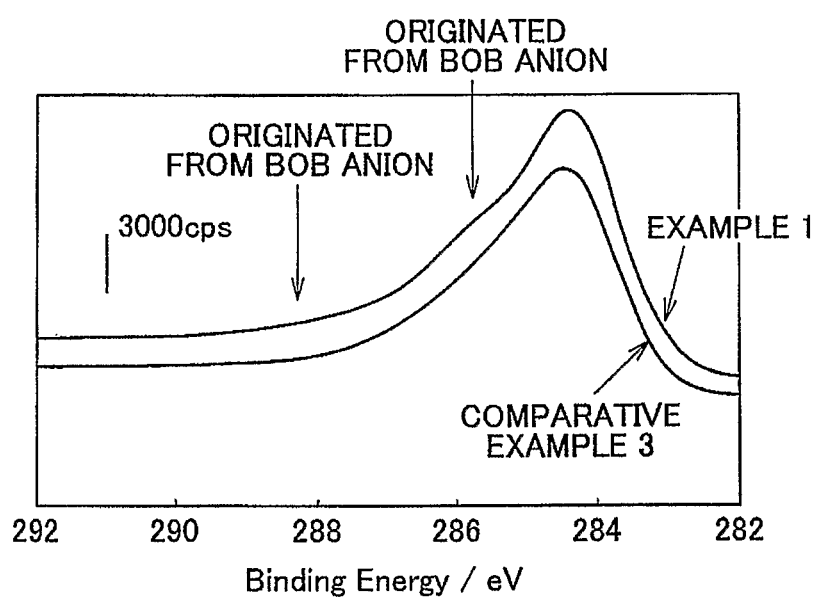
FIG. 7 is a C1s photoelectron spectroscopy (XPS) spectrum of a positive electrode layer of each cylindrical lithium secondary battery obtained in Example 1 and Comparative Example 3.

As shown in Table 3, the amount of film derived from F in each of the cylindrical lithium secondary batteries obtained in Examples 1 to 10 is lower than that of any of the cylindrical lithium secondary batteries obtained in Comparative examples 1 to 3. It is considered that this result indicates that the decomposition of the $LiPF_6$ is prevented. FIG. 7 is a C1sXPS spectrum of the positive electrode layer of each of the cylindrical lithium secondary batteries obtained in Example 1 and Comparative Example 3. In the C1sXPS spectrum of Example 1, the peak originated from the BOB anion of approximately 288 eV (the peak corresponding to C=O) and the peak originated from the BOB anion of approximately 286 eV (the peak corresponding to C—O were observed. However, these peaks were not observed in Comparative Example 3. As a result, it was confirmed in the cylindrical lithium secondary battery obtained in Example 1 that the film of the oxidative decomposition product of the BOB anion was formed on the surface of the positive e-electrode active material.

In this embodiment, the film of the oxidative decomposition product of the BOB anion is formed on the surface of the positive-electrode active material by adding the LiBOB to the nonaqueous electrolyte solution and performing the charging process within a predetermined high voltage range (at a voltage of at least 4.3 V, for example). Forming the film can prevent elution of the Fe component from the $LiFePO_4$ and prevent breakage of a SEI film formed on the surface of the carbon material serving as the negative-electrode active material. Therefore, the lithium secondary battery with excellent cycle characteristics can be obtained.

In addition, in this embodiment, the film of the oxidative decomposition product of the BOB anion can be formed by setting the upper limit voltage at, for example, at least 4.3 V at the time of charging, whereby the cycle characteristics can be improved.

Note that this invention is not limited to the embodiment described above. The embodiment is merely an example. Therefore, an embodiment having substantially the same configurations and capable of achieving the same effects as the invention is included in the technical scope of the invention.

The invention claimed is:

1. A method for manufacturing a lithium secondary battery, comprising:
    preparing a processing battery that has a positive electrode layer containing $LiFePO_4$ as a positive-electrode active material, a negative electrode layer containing a carbon material as a negative-electrode active material, and nonaqueous electrolyte solution containing $LiPF_6$ and LiBOB; and
    charging the processing battery at a high voltage necessary for forming a film of an oxidatively decomposed product of a BOB anion contained in the LiBOB, on a surface of the positive-electrode active material,
    wherein the high voltage is 4.8 V or lower, and is at least 4.6 V.

2. The method for manufacturing a lithium secondary battery according to claim 1, wherein the charge of the processing battery is performed at any of first to fifth charges of the processing lithium secondary battery.

3. The method for manufacturing a lithium secondary battery according to claim 1, wherein the concentration of the LiBOB contained in the nonaqueous electrolyte solution is at least 0.01 $mol/dm^3$ and not greater than 1.0 $mol/dm^3$.

4. The method for manufacturing a lithium secondary battery according to claim 1, wherein the processing battery is charged at the high voltage five times or less.

5. The method for manufacturing a lithium secondary battery according to claim 1, wherein the $LiFePO_4$ contained in the positive electrode layer is in the form of particle, and an average particle diameter of the $LiFePO_4$ is 1 μm to 50 μm.

6. The method for manufacturing a lithium secondary battery according to claim 1, wherein the proportion of the $LiFePO_4$ to the total positive-electrode active material contained in the positive electrode layer is at least 30 wt %.

7. The method for manufacturing a lithium secondary battery according to claim 1, wherein the thickness of the positive electrode layer is 10 μm to 250 μm.

8. The method for manufacturing a lithium secondary battery according to claim 1, wherein the positive electrode layer further contains at least one substance selected from a group consisting of $LiCoO_2$, $LiMn_2O_4$, $LiNiO_2$, $LiNi_{0.5}Mn_{1.5}O_4$, $LiNi_{1/3}Mn_{1/3}Co_{1/3}O_2$, $LiNi_{0.5}Mn_{0.5}O_2$, $LiCoPO_4$, and $LiMnPO_4$, as the positive-electrode active material other than the $LiFePO_4$.

9. The method for manufacturing a lithium secondary battery according to claim 8, wherein the positive electrode layer further contains $LiCoO_2$ as the positive-electrode active material other than the $LiFePO_4$.

10. A lithium secondary battery, wherein manufactured by using the method for manufacturing a lithium secondary battery according to claim 1.

11. A lithium secondary battery system, comprising:
    a lithium secondary battery manufactured by using the method for manufacturing a lithium secondary battery according to claim 1; and
    a controller for controlling an upper limit of a voltage for charging the lithium secondary battery to 4.1 V or lower.

12. A lithium secondary battery system, comprising:
    a lithium secondary battery which has a positive electrode layer containing $LiFePO_4$ as a positive-electrode active material, a negative electrode layer containing a carbon material as a negative-electrode active material, and nonaqueous electrolyte solution containing $LiPF_6$ and LiBOB, and in which a film of an oxidatively decomposed product of a BOB anion contained in the LiBOB is formed on a surface of the positive-electrode active material by charging the battery at a voltage of 4.8V or lower, and at least 4.6V; and
    a controller for controlling an upper limit voltage of charging the lithium secondary battery to 4.1 V or lower.

13. A method for manufacturing a lithium secondary battery, comprising:
    a processing battery preparing step for preparing a processing battery that has a positive electrode layer containing $LiFePO_4$ as a positive-electrode active material, a negative electrode layer containing a carbon material as a negative-electrode active material, and nonaqueous electrolyte solution containing $LiPF_6$ and LiBOB; and
    a film forming step of performing a charging process on the processing battery until a voltage of the processing battery falls within a voltage range necessary for forming a film of an oxidative decomposition product of a BOB anion contained in the LiBOB, on a surface of the positive-electrode active material;
    wherein the voltage range is 4.8V or lower, and is at least 4.6V.

* * * * *